UNITED STATES PATENT OFFICE.

JAMES B. RICKARDS, OF "THE GREEN," KILBURN, ASSIGNOR TO GEORGE FIFOOT LYDE, OF MANCHESTER, ENGLAND.

IMPROVEMENT IN BLEACHING DAMAGED COTTON.

Specification forming part of Letters Patent No. 145,816, dated December 23, 1873; application filed November 12, 1873.

*To all whom it may concern:*

Be it known that I, JAMES BATESON RICKARDS, of "The Green," Kilburn, in the county of Middlesex, England, have invented certain new and useful Improved Compounds, or Combinations of Ingredients, for Cleansing Vegetable Fibers, such as jute, hemp, flax, and cotton, of which the following is a specification:

This invention relates to the art of cleansing and bleaching vegetable fibers, such as cotton, flax, hemp, and jute; and it consists, first, in the combination of permanganate of potassa with chloride of lime, with the addition of glycerine thereto in certain cases; second, in the combination of carbonate of potassa and chloride of lime, to which glycerine may also be added, if required, and in the method of their use, as hereinafter set forth.

The permanganate of potassa and chloride of lime are employed in solution with water, in the usual manner of bleaching-solutions, and the proportion of the ingredients to the water and to each other varies with the kind of fiber treated, according to the obduracy of which greater or less strength is requisite, and which may readily be determined by the judgment of an expert operator, as in the case of other bleaching compounds.

The material to be treated is subjected to the action of this solution in a suitable vat or vessel until the fiber is sensibly affected, when it is transferred to a separate bath, containing a solution of the second compound, viz., carbonate of potassa and chloride of lime, and subjected to it until the desired purity and whiteness of the fiber be obtained, when it is removed, rinsed with pure water, and dried by exposure, or by artificial heat. For fibers which are hard the glycerine is required to be added, for its softening effect, to both the first and second compounds, or it may, if preferred, be used separately, and, preferably, after the treatment with one or the other, or both, of the compounds, in the manner described.

My invention is specially adapted for the cleansing or restoration of cotton and other vegetable fibers which have been damaged in transportation by bilge-water or other wetting, or by contact with earthy matters and impurities, to which they are exposed while in vessel or store, and in the various handlings through which they pass in shipping.

I claim as my invention—

1. The compound of permanganate of potassa, chloride of lime, and glycerine, substantially as and for the purpose set forth.

2. The compound of carbonate of potassa, chloride of lime, and glycerine, substantially as and for the purpose set forth.

3. The process of cleansing and bleaching vegetable fibers by means of the combination of permanganate of potassa and chloride of lime, and of carbonate of potassa and chloride of lime, with or without the use of glycerine, as set forth.

J. B. RICKARDS.

Witnesses:
 E. M. DANIEL,
 C. H. BROUGH,
  166 *Fleet street, London.*